United States Patent
Chien

(10) Patent No.: US 7,248,840 B2
(45) Date of Patent: Jul. 24, 2007

(54) RE-POSITIONING REMINDER FOR PERSONAL PORTABLE ELECTRONIC EQUIPMENT

(75) Inventor: Highly Chien, Taipei (TW)

(73) Assignee: Alcon Telecommunications Co., Ltd., Taipei (TW)

( * ) Notice: Subject to any disclaimer, the term of this patent is extended or adjusted under 35 U.S.C. 154(b) by 0 days.

(21) Appl. No.: 11/487,498

(22) Filed: Jul. 17, 2006

(65) Prior Publication Data

US 2006/0258407 A1 Nov. 16, 2006

Related U.S. Application Data

(63) Continuation-in-part of application No. 10/735,612, filed on Dec. 16, 2003, now Pat. No. 7,079,862.

(30) Foreign Application Priority Data

Dec. 14, 2005 (CN) .................. 2005 2 0144411 U

(51) Int. Cl.
*H04B 1/034* (2006.01)

(52) U.S. Cl. .................... 455/95; 455/11.1; 455/414.1; 340/309.7; 340/457

(58) Field of Classification Search ................ 455/418, 455/404.1, 410, 420, 95, 11.1, 400, 414.1, 455/230, 231; 340/853.2, 426.25–426.26, 340/3.43, 572.1, 309.7, 457, 539.26
See application file for complete search history.

(56) References Cited

U.S. PATENT DOCUMENTS

| 5,406,261 | A | * | 4/1995 | Glenn | 340/571 |
|---|---|---|---|---|---|
| 5,461,663 | A | * | 10/1995 | Motegi | 340/7.55 |
| 6,294,997 | B1 | * | 9/2001 | Paratore et al. | 340/572.1 |
| 6,351,214 | B2 | * | 2/2002 | Eskildsen et al. | 340/550 |
| 6,819,256 | B2 | * | 11/2004 | Hampton | 340/691.6 |
| 6,969,183 | B2 | * | 11/2005 | Okubo et al. | 362/466 |
| 2004/0090773 | A1 | * | 5/2004 | Bryan | 362/156 |
| 2004/0204915 | A1 | * | 10/2004 | Steinthal et al. | 702/188 |

* cited by examiner

*Primary Examiner*—CongVan Tran
(74) *Attorney, Agent, or Firm*—Troxell Law Office, PLLC

(57) ABSTRACT

The present invention relates to a re-positioning reminder for personal portable electronic equipment. Such a reminder is housed in the electronic equipment and is at least equipped with an environment detecting unit, a control unit, a time counting module and at least one vibration/ringing circuit; wherein the environment detecting unit is used to monitor the outer surroundings and generates a monitoring value; the control unit is coupled to the environment detecting unit for the reception of the monitoring value which is compared with a preset value in the control unit to check if the environment is in a normal state or not and keeps the time counting module under its control; the time counting module is connected to the control unit and can start a time countdown according to the preset time; the vibration/ringing circuit is connected to the control unit and is controlled by the control unit to send off an alarm at the termination of the time countdown procedure to remind a user to put a personal portable electronic equipment back to a preset place so as to prevent the same from being lost as a result of ignorance.

12 Claims, 2 Drawing Sheets

RE-POSITIONING REMINDER FOR PERSONAL PORTABLE ELECTRONIC EQUIPMENT

CROSS REFERENCE TO RELATED APPLICATION

This application is a continuation-in-part (CIP) of U.S. patent application Ser. No. 10/735,612 filed by the applicant on Dec. 16, 2003, now U.S. Pat. No. 7,079,862 the entire disclosure of which is incorporated herein by reference.

FIELD OF THE INVENTION

The present invention relates to personal portable electronic equipment, and particularly related to a re-positioning reminder which serves to prevent a personal portable electronic equipment from being easily lost.

BACKGROUND OF THE INVENTION

Personal portable electronic equipment, especially mobile phones are the most influential personal communication facility ever produced in the history of mankind. When people are enjoying the relatively unlimited convenience in time and space provided by such a communication instrument, they are also worried about the loss of the precious and expensive mobile phones. Once a mobile phone is lost due to ignorance, the cost of the phone is a relative trivia in case the lost phone is used by other people to commit crimes or is dialed in theft with the owner billed by such numerous phone calls, causing the user into unnecessary troubles.

In consideration of tackling such a problem of losing expensive personal portable electronic equipment due to carelessness, there have been many kinds of reminder devices developed from well known techniques and applied to expensive and easily lost personal items, such as mobile phones, NB computers or golf equipment due to ignorance or carelessness. The currently popular reminders are all made in a form to include a major and a minor device wherein the minor and major devices are respectively mounted onto the personal portable equipment and carried by a person to move around. Thus, once the major and the minor devices are separated at such a long distance that no signals can be effectively received, an alarm will be produced. However, such the wireless radio operated major and minor devices of the prior art have many disadvantages that are not easily overcome in nature, such as the volume of the devices being not easily minimized, the cost being too high and the constant interference of the radio frequencies, resulting in abnormal operations frequently. Besides, power consumption of the devices results in frequent replacement of batteries that can only be used in a few weeks, not in conformance of principles of the environment protection and economy.

SUMMARY OF THE INVENTION

In consideration of the technical disadvantages of the preceding known art, the present invention provides a re-positioning reminder for personal portable electronic equipment to solve the technical problem of easy losing of such personal portable electronic equipment.

The present invention provides a re-positioning reminder for portable electronic equipment in which the reminder is housed, it mainly includes: at least an environment detecting unit, a control unit, a time counting module, and a vibration/ring circuit;

the environment detecting unit is used to monitor the outer surroundings and generates a monitoring value;

the control unit is coupled to the environment detecting unit for the reception of a monitoring value which is compared with a preset value in the control unit to determine if the surroundings is in a so called normal state or not and further to control the operation of the time counting module;

the time counting module is connected to the control unit and can carry out time countdown according to a preset time period;

the vibration/ring circuit is coupled to the control unit which will make the vibration/ring circuit to give off alarm sound at the termination of a time countdown operation.

Furthermore, the control unit also includes:

an environment abnormality judging module is set up with a preset value which is compared with a received monitoring value to evaluate if the environment is in a normal state or not; and a portable electronic equipment working status identification module is employed to check if this portable electronic equipment is in operation or not. Moreover, the environment detecting module can be a light responsive or light actuated electronic component, for example, a photo resistor CDS, a photo transistor PT, a photodiode PD, photoelectric transducer LTV (light transforming volt) or a photo sensitive component for video camera; or an infrared operated body temperature detector PIR; or a magnetism detector as Hall sensor and etc.

Besides, a re-positioning reminder program corresponding to the time counting module is stored in a program storage device of the portable electronic equipment and the program is either input into the program storage device before the electronic equipment is finished of its production and delivered out of a factory or can be downloaded into the program storage device by a wire or from the air in a wireless manner after it is already delivered out of a production factory as a finished product.

Moreover, the control unit is the self equipped CPU of the portable electronic equipment or a single chipped microprocessor.

Moreover, the vibration/ring circuit is the original self-equipped circuit of the portable electronic equipment or is an independent vibration/ring circuit externally in connection to a speaker of the portable electronic equipment.

Moreover, the environment detecting unit is mounted onto the portable electronic equipment at such a place that a mobile phone seat or mount can block light from receiving by the environment detecting unit when the electronic equipment is engaged with the mobile phone seat or mount.

Moreover, the present invention is suitable for a personal portable electronic equipment equipped with a bluetooth earphone, the alarm signals can be transmitted via wireless transmitter/receiver of the portable electronic equipment to such a bluetooth earphone for the purpose of getting a user alarmed via the bluetooth earphone.

The re-positioning reminder of the present invention is effectively characterized by that:

the re-positioning reminder for personal portable electronic equipment is equipped with in the electronic equipment at least an environment detecting unit, a control unit, a time counting module so that once the portable electronic equipment is removed from a fixed position and is not returned to that position within a preset time, the vibration/ringing circuit will be actuated to give off alarm sound to remind a user not to forget his or her portable electronic equipment. Therefore, it can further supplement and expand the functions of the portable electronic equipment.

To better understand the structures, features and effects of the present invention, the preferred embodiments of the present invention are demonstrated in accompany with the drawings and the detailed description of the present invention as follows:

DETAILED DESCRIPTION OF THE PREFERRED EMBODIMENTS

Figure 1:
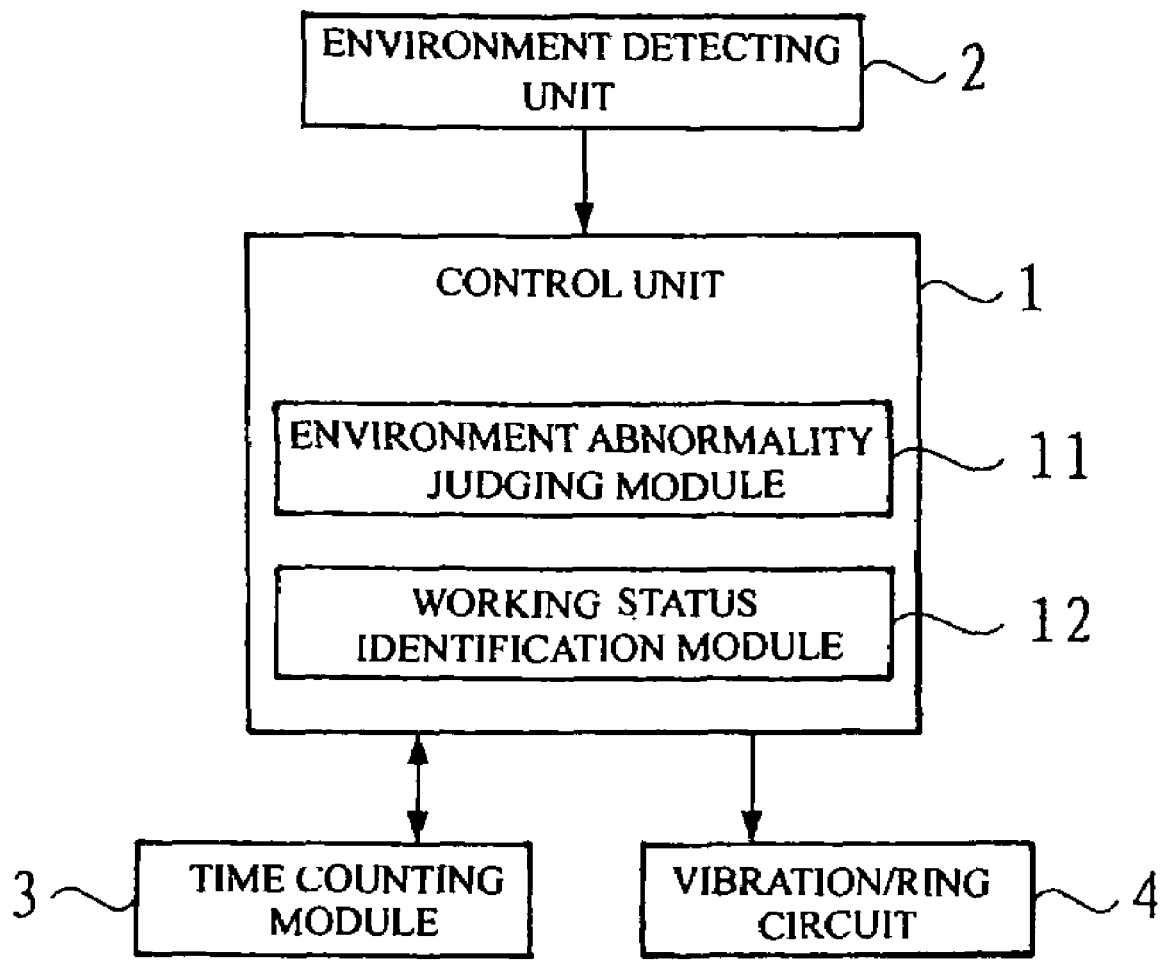
FIG. 1 is a diagram showing the basic logical structure of the present invention.
Figure 2:
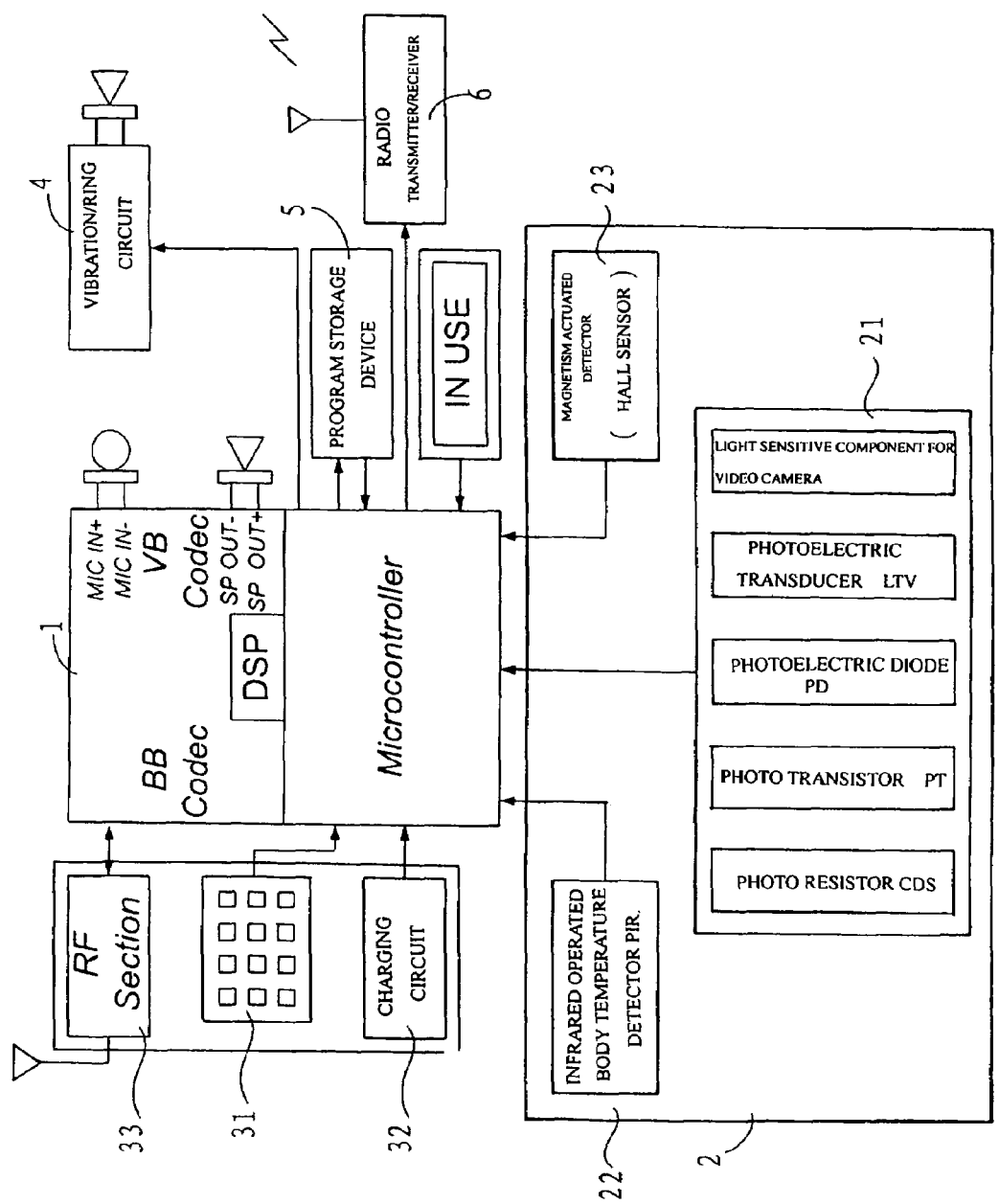
FIG. 2 is a diagram showing the practical structural layout of the embodiment of the present invention.

Referring to FIG. 1 and FIG. 2, the present invention can be clearly illustrated by way of the practical embodiments of the re-positioning reminder of the personal portable electronic equipment.

As shown in the figures, the re-positioning reminder for personal portable electronic equipment of the present invention mainly includes a control unit 1, an environment detecting unit 2, a time counting module 3 and at least one vibration/ringing circuit 4. The control unit 1 is further equipped with an environment abnormality judging module 11 and a portable electronic equipment working status identification module 12.

Wherein, the environment detecting unit 2 is used to monitor the outer surroundings and generates a monitoring value. The environment detecting unit 2 may use a light responsive electronic component 21, such as a photo resistor CDS, a photo transistor PT, photo diode PD, a photoelectric transducer or light/volt transformer LTV or a light sensitive component for video camera, and can also be an infrared operated body temperature detector PIR 22, or a magnetism detector 23 such as a Hall sensor and etc.

The control unit 1 is coupled to the environment detecting unit 2 for the reception of a monitoring value. The control unit 1 may be a CPU of a mobile phone or a single-chipped microprocessor.

The environment abnormality judging module 11 is set up with a preset value which is compared with a received monitoring value to evaluate if the environment is in a so-called normal state or not. Taking the environment detecting unit 2 using a photo resistor for example, as it is well known that the resistance of the light sensitive photo resistor will be varied in response to the intensity of an incident light, in the meanwhile, the environment abnormality judging module 11 having a preset resistance will be informed of the abnormal status of the surroundings as long as the resistance of the light sensitive photo resistor produced by the incident light is smaller than a preset resistance thereof. In the same way, the environment abnormality judging module 11 can set up different preset values as a result of the adoption of the different kinds of environment detecting unit 2 so as to make the detection of the surroundings normal or not possible. For example, when the environment detecting unit 2 adopts a photodiode PD, an electric current will be generated as a result of exposure to light; this physical nature can be applied to this invention by setting the electric current as a preset value. When the environment detecting unit 2 makes use of a photo transistor PT which is characterized by that an electric current will be amplified as a result of the photo transistor is exposed to light. The preset value thereof can be set a current value. When the environment detecting unit 2 is a light/volt transformer LTV which is characterized by that a voltage output is generated as a result of exposure to light, so, the preset value can be set as a voltage. As the environment detecting unit 2 is an infrared operated body temperature detector PIR which is employed to take the measurement of human body temperatures that range normally between 35–38 in Celsius degrees; so, the value is generally set as 35 and 38 Celsius degrees; and when the detected temperature by the PIR is lower than 35 Celsius degrees or higher than 38 Celsius degrees, the surroundings will be judged as being abnormal by the environment abnormality judging module. The preceding set values are cited as examples and they can be modified depending on the practical situations. Moreover, the preset values can be randomly set up according to the variations of the surroundings; for instance, it can be variably set up in accordance with the user's positions and seasonal changes of nature. The above illustrated examples are only the preferred embodiments of the present invention and is not intended to limit the scope thereof, any environment detecting unit based on the structures and ideas of the present invention to effect the purpose of the re-positioning reminder should be regarded as falling into the protection scope of the present invention.

The portable electronic equipment working status identification module 12 is operated according to the signals transmitted from the hardware circuits or a software of a portable electronic equipment to identify the portable electronic equipment is in operation or not. For instance, if a user is playing a video game on a keyboard, receiving instant messages, taking photos, connecting to internet, sourcing information, watching video play on a website and dialing, etc., it can be well informed by way of the keyboard circuit 31 and all kinds of transmission signals inside the portable electronic equipment that the same is in operation; if the portable electronic equipment is put in electric charge, the status of the equipment being in use can be detected by way of the charging circuit 32; or, in case the portable electronic equipment is in radio signal transmission, i.e., the same is sending signals, this state of the equipment being operated can be identified by the communication module 33.

When the control unit 1 is informed by the environment abnormality judging module 11 and the portable electronic equipment working status identification module 12 of that the portable electronic equipment is in an abnormal surroundings and not being in use, then the time counting module 11 is actuated to start a time countdown.

The time counting module 3 is in connection to the control unit 1 and carries out a time countdown based on a preset time domain. The corresponding program of the time counting module 3, i.e., a re-positioning reminder program in a personal portable electronic equipment which can perform a time countdown, can be stored in a program storage device 5 of a mobile phone by a phone manufacturer before the mobile phone is finally produced and delivered out of a factory or can be downloaded into the program storage device via a cable or in a wireless manner from the air by a maintenance service agent or by users themselves. The preset time countdown domain can be optionally set as a functional module selected by a user on a personal portable electronic equipment or be fixed in unison by the makers of the portable electronic equipment.

The vibration/ring circuit 4 is also connected to the control unit 1 which controls the give-off of an alarm sound. The vibration/ring circuit 4 can adopt the self equipped vibration/ring circuit 4 of a personal portable electronic equipment which can operate in two modes, producing ring sound or vibrations, depending on the needs of a user to set in various operational forms or sounds; or an independent vibration/ring circuit externally in connection to a speaker of the mobile phone. What needs to clarify here is that the form of the alarm sound produced by the re-positioning reminder can be made in conformance to the ring sound of the portable electronic equipment or is not limited at all by the portable electronic equipment. For example, when the alarm mode of the portable electronic equipment is set in a vibration form, the alarm of the re-positioning reminder function can be set in an alarm sound; moreover, when the alarm mode of the portable electronic equipment is set in a ring sound in a mono frequency, then the re-positioning reminder function can be set to operate in a melodic alarm sound and etc. Of course, the mono frequency ring sound or melodic alarm can be stored in the storage device of the portable electronic equipment before the same is finally produced and shipped out of a factory or can be downloaded by users when it is already out of a factory. As to the practical choice of operations, it is a well-known art and is no need to state in details.

What should be clarified is that the function of the re-positioning reminder of the present invention can be optionally turned on or off directly on the portable electronic equipment by users themselves according to the practical needs.

Next, to take the most widely used mobile phones as an example of the portable electronic equipment of the present invention to illustrate the advantages and characteristics thereof. In this embodiment, a light actuated component is employed as the environment detecting unit and the CPU of a mobile phone serves as the control unit. The application field of the present invention should not be limited only in this embodiment, any personal portable electronic equipment, such as a PDA and etc. all can make use of the present invention to remind users of not forgetting or leaving their personal portable electronic equipment behind.

A light actuated component is exposed to light and produces an electric voltage, which is transmitted to the control unit;

The environment abnormality judging module of the control unit can judge if the surroundings is in a normal state or not by making the received electric voltage and a preset value therein in comparison;

If the outcome of this environment judging is abnormal, then the portable electronic equipment working status identification module of the control unit will determine if the mobile phone is in operation or not;

If the mobile phone is not in use, then the control unit will actuate the time counting module to start a time countdown;

Once the control unit detects any one of the signals given above, for instance, the external surroundings turns out in a normal state or the mobile phone is in operation or is subject to an electrical charge, then the time countdown performed by the time counting module is terminated; or immediately stops the ringing alarm sound and resumes a stand-by status. When the operation of the mobile phone is completed or the charging of it is terminated, then the time countdown operation is resumed to function and the mobile phone must be brought back to its set position within a preset time period otherwise the alarm will be actuated accordingly.

When the control unit does not detect any signals cited above within the time countdown period, then the vibration/ring circuit will start to operate and gives off alarm sound in response to remind the user of the mobile phone to bring the phone back in a set position.

It becomes apparent from the preceding procedures that when a user takes the mobile phone out of a handbag without making any operation (for instance, just to read the current time or to show around), then the light actuated component will be activated by light to generate a corresponding current or voltage variation and the detected value which can be a value of current or voltage is transmitted to the control unit. Then the environment abnormality judging module of the control can find that the detected value has already in excess of a preset value through comparisons and the working status identification module of the control unit finds that the mobile phone is not in operation, then the time counting module of the control unit starts a time countdown. At the end of the time countdown, the control unit controls the vibration/ring circuit to give off alarm to remind a user that the mobile phone is not placed in a preset position. On hearing an alarm sound from the mobile phone, the user surely will put the phone in a light sheltered or blocked place, for instance, inside of a handbag or a drawer and etc. so as to effect the purpose of protecting the mobile phone from being lost by accident or ignorance.

For another instance, if a male user putting his mobile phone in his pocket gets in a taxi and the phone accidentally slips out of the pocket without notice, once the phone is exposed to light after a preset time period, the alarm will be actuated so as to prevent the mobile phone from losing by accident or ignorance.

Of course, if the user begins pressing buttons to operate on the phone before the termination of the time countdown or to get the phone in charge via a plug, the working state identifying module will acquire this signal and the control unit will put an end to the time countdown according to the signal. In the same way, if the user puts the phone back in a light proof place, such as the original bag or drawer, in time, the working state identifying module will find out the received value is lower than the preset value, and the control unit will terminate the time countdown in accordance with the signal.

It becomes apparently known from the preceding description of the structure of the present invention, the environment detecting unit can be housed in the mobile phone and can also be exposed externally of the phone according to the physical natures thereof. To meet the habitual necessity of some users preferring to put their mobile phones onto a phone seat or mount on tables in offices, the light actuated component on mobile phones may be turned on by light unavoidably to start the time counting module to carry out a time countdown and then the vibration/ring circuit is actuated to give off alarm sound, the light actuated component can be placed at such a place that when the mobile phone is engaged with a phone seat or mount, the light actuated component can be sheltered from light.

In the same manner, at present, more and more mobile phone users adopt blue tooth earphone to increase the functional facility of mobile phones. In this case, the re-positioning reminder of the present invention can also play a role. The alarm signals issued from the vibration/ring circuit can be sent out to the bluetooth earphone by way of the wireless transmitter/receiver 6 of a mobile phone as shown in FIG. 2 to warn the user of the mobile phone wearing a bluetooth earphone.

In summary, by way of the present invention, mobile phones must be put or remained at some particular places; if not, an alarm sound will be produce at the end of a preset time period to remind users so as to prevent the users from losing or leaving their mobile phones behind as a result of ignorance or neglect.

The preceding examples illustrate the most practical embodiments of the present invention, and any variations or modifications based on the claims of the present invention should be regarded as falling in the claimed scope of the present invention.

I claim:

1. A portable electronic device assembly comprising:
   a) a portable electronic device; and
   b) a re-positioning reminder located in the portable electronic device and having:
      i) a environment detecting unit monitoring surroundings located on an interior or an exterior of the portable electronic device and generating a monitoring value, the environment detecting unit is a device selected from a group consisting of a light responsive component and a light actuated component;
      ii) a control unit electrically connected to the environment detecting unit, the control unit receiving and comparing the monitoring value with a preset value to determine whether the portable electronic device is in a predetermined environment
      iii) a time counting module electrically connected to and controlled by the control unit, the time counting module performing a countdown operation based on a preset time period; and
      iv) at least a vibrating/ring circuit electrically connected to and controlled by the control unit, the vibrating/ring circuit producing an alarm sound/vibration at an end of the countdown operation.

2. The portable electronic device assembly according to claim 1, wherein the portable electronic device is a mobile phone.

3. The portable electronic device assembly according to claim 1, wherein the portable electronic device is a personal digital assistant.

4. The portable electronic device assembly according to claim 1, wherein the environment detecting unit is a device selected from a group consisting of a light sensitive resistor, a photo resistor, a photoelectric transistor, a photo diode, a photoelectric transducer, and a photosensitive component for a video camera.

5. The portable electronic device assembly according to claim 1, wherein the control unit includes:
   a) an environment abnormality judging module having a preset judging value and comparing the preset judging value with the monitoring value to determine whether the portable electronic device is in the predetermined environment; and
   b) a portable electronic equipment working status identification module determining when the portable electronic device is in operation or not.

6. The portable electronic device assembly according to claim 1, wherein the environment detecting unit is an infrared operated body temperature detector.

7. The portable electronic device assembly according to claim 1, wherein the environment detecting unit is a Hall sensor.

8. The portable electronic device assembly according to claim 1, further comprising a re-positioning reminder program corresponding to said time counting module is stored in a program storage device of a portable electronic equipment and said program is either input into said program storage device before said electronic equipment is finished of its production and delivered out of a factory or can be downloaded into said program storage device via wire or from the air in wireless manner after it is already delivered out of a production factory as a finished product.

9. The portable electronic device assembly according to claim 1, wherein the control unit is a device selected from a group consisting of a self equipped CPU of the portable electronic device and a single chipped microprocessor.

10. The portable electronic device assembly according to claim 1, wherein the vibrating/ring circuit is a circuit selected from a group consisting of an original self equipped circuit of the portable electronic device and an independent vibration/ring circuit externally connected to a speaker of the portable electronic device.

11. The portable electronic device assembly according to claim 1, further comprising a mount selectively connected to the portable electronic device, the mount preventing the environment detecting unit from receiving light when the mount and the portable electronic device are connected.

12. The portable electronic device assembly according to claim 1, wherein the portable electronic device includes a wireless earphone receiving alarm signals transmitted via a transmitter/receiver of the portable electronic device.

* * * * *